United States Patent [19]
Fujiwara

[11] Patent Number: 5,805,723
[45] Date of Patent: Sep. 8, 1998

[54] IMAGE PROCESSING APPARATUS WITH MEANS FOR ADJUSTING IMAGE DATA FOR DIVIDED AREAS

[75] Inventor: Yoko Fujiwara, Tokyo, Japan

[73] Assignee: Minolta Co., Ltd., Osaka, Japan

[21] Appl. No.: 607,348

[22] Filed: Feb. 26, 1996

[30] Foreign Application Priority Data

Feb. 28, 1995 [JP] Japan ................................ 7-040415

[51] Int. Cl.$^6$ .............................. G06K 9/46; G06K 9/40
[52] U.S. Cl. ........................ 382/172; 382/168; 382/271; 382/272
[58] Field of Search .................... 382/172, 168, 382/254, 271, 272, 169

[56] References Cited

U.S. PATENT DOCUMENTS

| | | | |
|---|---|---|---|
| 4,950,894 | 8/1990 | Hara et al. | 382/172 |
| 5,138,971 | 8/1992 | Yokoyama | 382/272 |
| 5,450,502 | 9/1995 | Eschbach et al. | 382/169 |
| 5,454,049 | 9/1995 | Oki et al. | 382/272 |
| 5,524,070 | 6/1996 | Shin et al. | 382/272 |

FOREIGN PATENT DOCUMENTS

| | | | |
|---|---|---|---|
| 4-37258(A) | 2/1992 | Japan | H04N 1/40 |
| 6-113139 | 4/1994 | Japan | H04N 1/40 |

Primary Examiner—Jose L. Couso
Assistant Examiner—Matthew C. Bella
Attorney, Agent, or Firm—Burns, Doane, Swecker & Mathis, LLP

[57] ABSTRACT

An object of the present invention is to provide an image processing apparatus that reads density unevenness contained in the image, based on the base density of the image data and performs density data correction. The present invention is an image processing apparatus comprising a reading device for reading an original image and for generating image data, an area dividing device for dividing an area of the original image, a histogram making device which makes a histogram for each divided area in order to extract a base density for each area divided by the area dividing device, wherein the histogram represents a distribution of density level of all pixels in each divided area, a minimum base density extracting device for extracting a minimum base density from among all of the base densities extracted from the histogram for each area, and a control device for adjusting image data for each divided area so as to correspond each of the extracted base density to the minimum base density extracted by the minimum base density extracting device.

15 Claims, 13 Drawing Sheets

B: base density level

BL: black smear level

NB: the number of pixels having a smaller density level than base density level B NBL: the number of pixels having a larger density level than black smear level BL

*PRIOR ART*

IMAGE PROCESSING APPARATUS WITH MEANS FOR ADJUSTING IMAGE DATA FOR DIVIDED AREAS

BACKGROUND OF THE INVENTION

The present invention relates to an image processing apparatus used in image reading equipment such as a microfilm reader-scanner, for example.

An image processing apparatus used in such image reading equipment as a microfilm reader-scanner projects light from a light source onto the microfilm. An image corresponding to the light that passed through the microfilm is photoelectrically converted and the image data obtained by means of the photoelectric conversion is output in the form of two-level data (binary data) or multiple-level data.

The binary data refers to data that expresses a pixel as white or black and one pixel is expressed by one bit. On the other hand, multiple-level data refers to data that expresses with 256 gradations, for example. In this case, one pixel is expressed a pixel by eight bits.

The image data read by the microfilm reader-scanner (density data for each pixel) contains density unevenness data caused by changes in lighting conditions during projecting the image of the microfilm onto a screen. Also, the density of all microfilm is not the same. (Density differences as to film and density data unevenness due to lighting unevenness caused by changes in lighting conditions in connection with the projection system will hereinafter be referred to simply as 'density unevenness'). This density unevenness is not an issue in the case of film having an adequate contrast, but it does become an image quality issue with regard to film having a low contrast.

Figure 15:
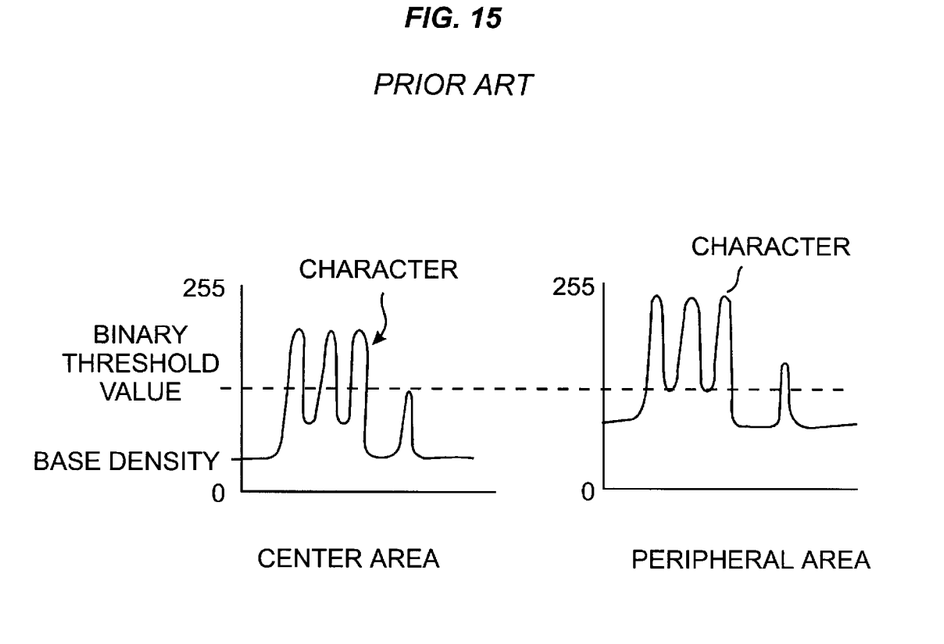
FIG. 15 shows an example of the prior art showing image data containing density unevenness.

FIG. 15 shows density data in the peripheral area and in the center area of an image of one frame of film that suffers from density unevenness. In the example shown in FIG. 15, the density data for the screen center area and for the peripheral area are slightly different. Because of this, where the level indicated by a dotted line in FIG. 15 is set the binary threshold level and the entire frame is expressed in terms of binary data using a single binary threshold level, there is a section in the peripheral area where the characters and background cannot be differentiated clearly. In other words, a common binary threshold level to clearly differentiate the characters and the background throughout the entire frame does not exist.

Therefore, where the entire frame is expressed in terms of binary data using a single binary threshold level, even if the exposure is adjusted, the screen peripheral area may become black-smeared or the screen center area may become blurred. Similarly, in the case of multiple-level output as well, an unsightly image in which the screen peripheral area is smeared results.

In addition, where the density unevenness is smaller than in the previous example and an image having a relatively even density throughout the entire frame can be obtained using a single binary threshold level, the most appropriate allowable exposure range is reduced and therefore the user must adjust the exposure through repeated trial and error while checking the output in order to obtain an image having even density.

With this as a backdrop, a method in which the image for one frame is divided into multiple areas, the most appropriate binary threshold level is sought for each of said areas, and binary expression is made using the threshold level line created by connecting said binary threshold levels, has been conventionally known.

There is also a method in which the image for one frame is divided into multiple areas, a histogram is made based on the difference in density between an area of concern and its neighboring area, and a binary threshold level to express the area of concern in terms of binary data is sought based on said histogram, whereby the area of concern is expressed in binary data using the binary threshold level thus obtained.

However, since in these methods the density unevenness contained in the original image data is not removed but the threshold value is changed when the data is converted into binary data, they cannot be used in cases where the image data is output in the form of multiple-level data. Further, since density unevenness still exists in the image processing stage prior to the conversion into binary data, background noise cannot be adequately eliminated throughout the frame. As a result, background noise may become enhanced by Modulation Transfer Function correction (hereinafter refer to as 'MTF') and occur easily.

Moreover, in the case where a correction value to correct for the density unevenness of the entire film is sought from the character data of the character area of film that has density unevenness, since the character data depends on the spatial frequency of the image due to MTF deterioration and a value cannot be easily extracted in an area without characters, this method is not suitable for extracting a density correction value.

SUMMARY OF THE INVENTION

Accordingly, an object of the present invention is to provide an image processing apparatus that improves on the conventional apparatus. Another object of the present invention is to provide an image processing apparatus that reads density unevenness contained in the image, based on the base density of the image data and performs density data correction.

In order to achieve said objects, the present invention is an image processing apparatus comprising a reading means for reading original image and for generating image data, an area dividing means for dividing an area of said original image, a base density extracting means which extracts a base density for each area divided by said area dividing means, a selection means for selecting one optional base density from among all of said base density extracted by said base density extracting means, and a control means for adjusting image data for each divided area so as to correspond each of said extracted base density to said one optional base density selected by said selection means.

In order to achieve said objects, the present invention is also an image processing apparatus comprising a reading means for reading original image and for generating image data, an area dividing means for dividing an area of said original image, a histogram making means which makes a histogram for said each divided area in order to extract a base density for each area divided by said area dividing means, wherein said histogram represents a distribution of density level of all pixels in said each divided area, a minimum base density extracting means for extracting a minimum base density from among all of said base density extracted from said histogram for each area, and a control means for adjusting image data for each divided area so as to correspond each of said extracted base density to said minimum base density extracted by said minimum base density extracting means.

In the present invention constructed in the manner described above, the image of a frame is divided into multiple areas, a histogram is made for each of said areas, a base density is extracted from this histogram, and the base densities for each area are unified.

Further, in the present invention, the image is divided into multiple areas, a histogram is made for each of said areas, and a base density is extracted for each area based on said histogram. A minimum level is then sought from among the base densities for all areas, and the base densities for other areas are adjusted so as to correspond to this minimum level.

Here, when the base densities for each of the divided areas are adjusted to said minimum level, the differences between said minimum level and the extracted base densities of said each area are set as the density correction levels for said each area, and correction for the density unevenness is performed based on the shifting of the image density/output characteristics (γ-curve) based on these density correction levels.

Therefore, because density correction is performed by reading only the base density, without using character data, correction values for only the density unevenness may be obtained, and differentiation between the base and characters may be clearly performed.

In addition, because the density/output characteristics (γ-curve) are shifted based on the density correction values, images with even density may be obtained even where multiple-levels are output.

These and other objects, advantages and features of the present invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DETAILED DESCRIPTION OF THE INVENTION

One embodiment of the present invention will be explained below with reference to the attached drawings.

Figure 1:
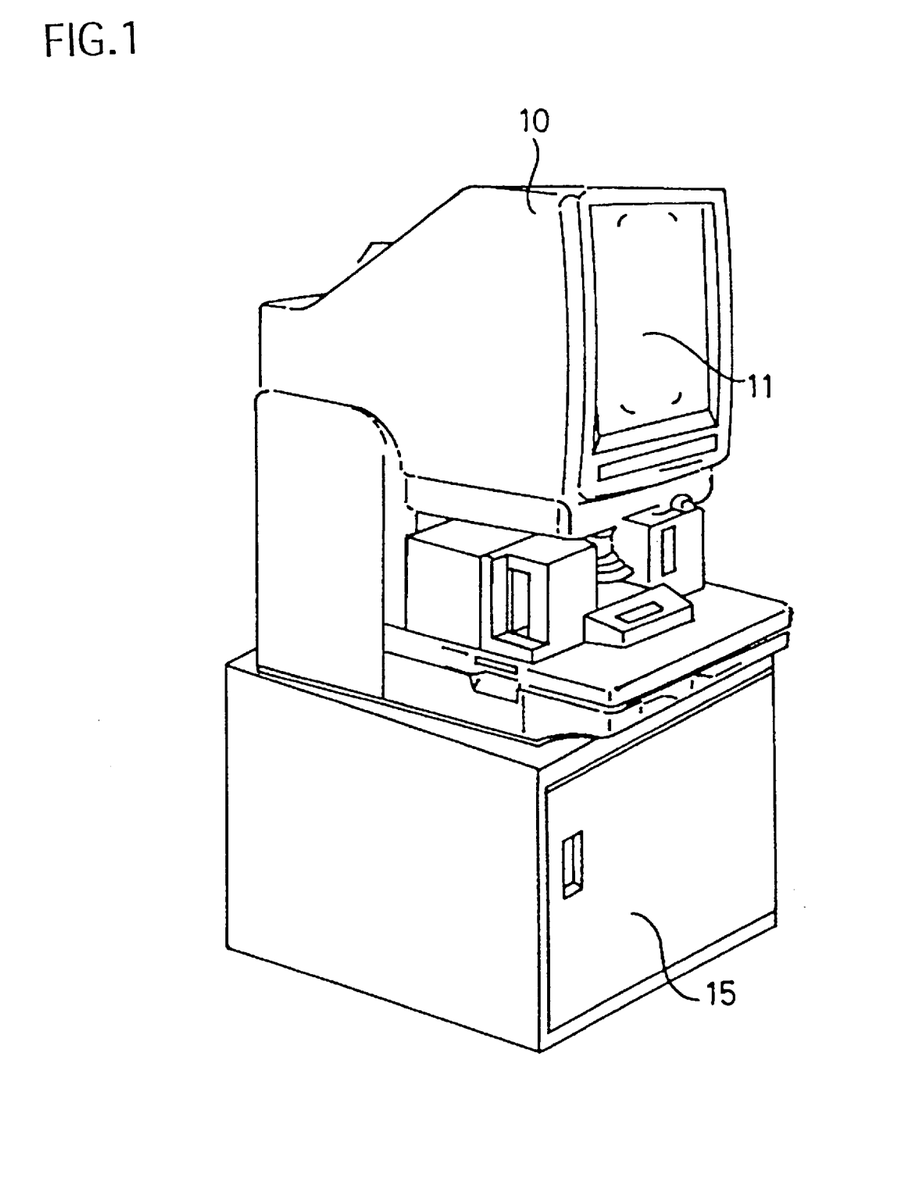
FIG. 1 shows the external view of a microfilm reader-scanner of one embodiment of the present invention.

FIG. 1 shows the external view of a microfilm reader-scanner with which the image processing apparatus of the present invention is equipped. The microfilm reader-scanner 10 has the functions of projecting a microfilm image onto screen 11, as well as reading and outputting to an output device such as a printer or personal computer a microfilm image by means of a photoelectric conversion means such as a line sensor.

Figure 2:
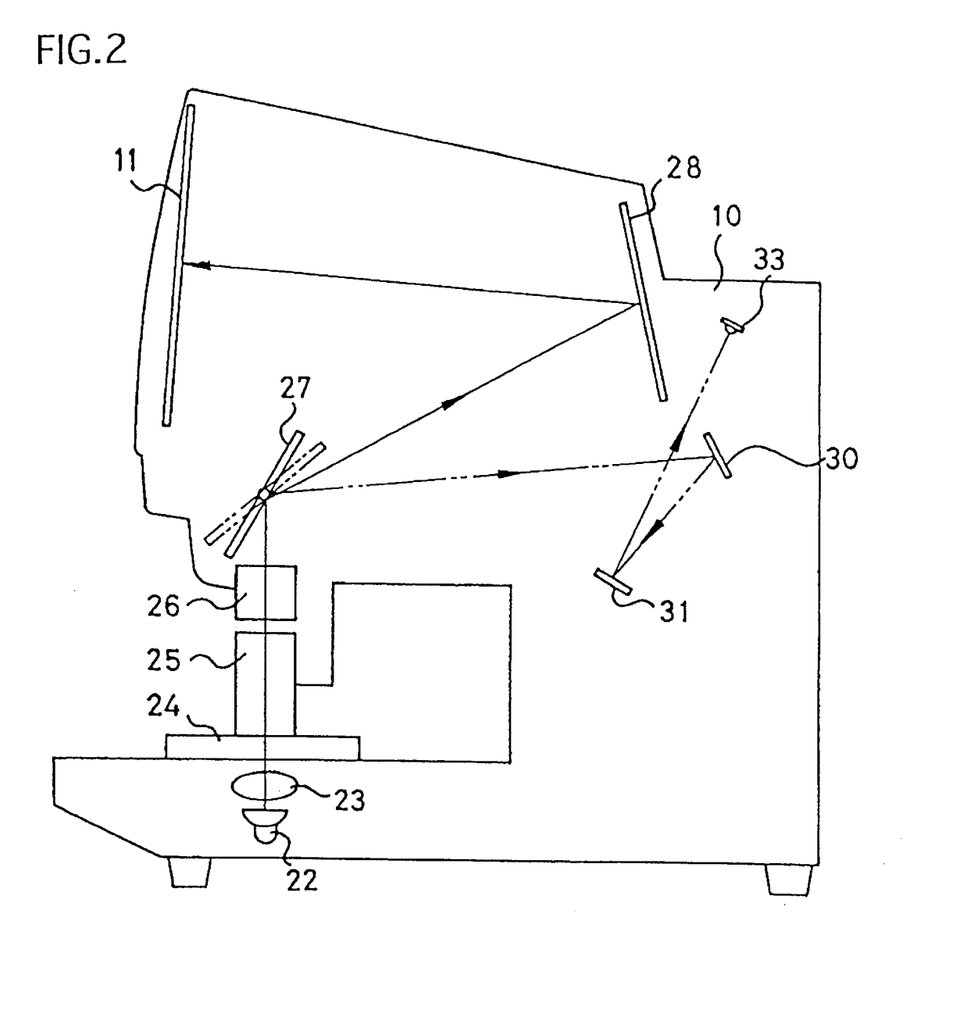
FIG. 2 shows the interior construction of the microfilm reader-scanner of said embodiment.

FIG. 2 shows the interior construction of this reader-scanner. The image of a microfilm set in carrier 24 is projected onto screen 11 via mirrors 27 and 28 by means of light irradiated onto the microfilm via lamp 22 and condenser lens 23, said light passing through the microfilm, lens 25 and aperture 26, or said microfilm image is projected onto image sensor 33 comprising a CCD, etc. via mirrors 30 and 31 by changing the direction of mirror 27. In FIG. 2, the solid line indicates the reader system optical path of the image projected onto screen 11, and the dashed-dotted line indicates the optical path for the scanning system that leads the light to image sensor 33 in order to read the image.

Figure 3:
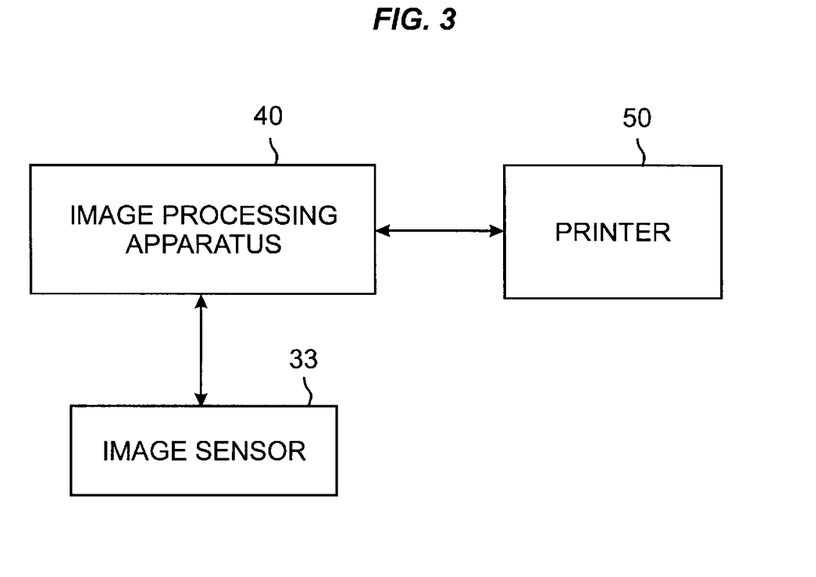
FIG. 3 is a block diagram showing a system construction of the microfilm reader-scanner of said embodiment.

FIG. 3 is a block diagram of the signal processing system of this apparatus. The image read by image sensor 33 is inputted in an image processing apparatus 40 as electric signals and is converted into black/white binary data or multiple-level data in the case of density gradation expression, following which image processing is carried out as described below, and the read microfilm image is then printed onto paper by printer 50.

Figure 4:
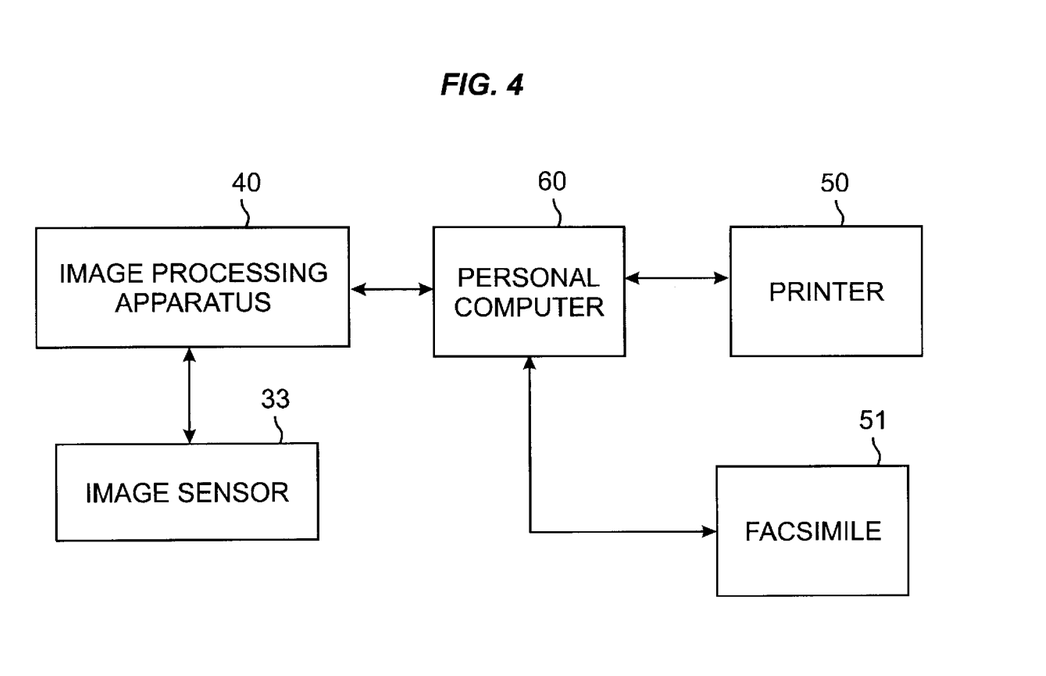
FIG. 4 is a block diagram showing another system construction of the microfilm reader-scanner of said embodiment.

FIG. 4 is also a block diagram of the signal processing system of the microfilm reader-scanner. This diagram shows a construction where the signals from the image processing apparatus are received by personal computer 60, etc., and then output to a device such as printer 50 or facsimile 51.

Figure 5:
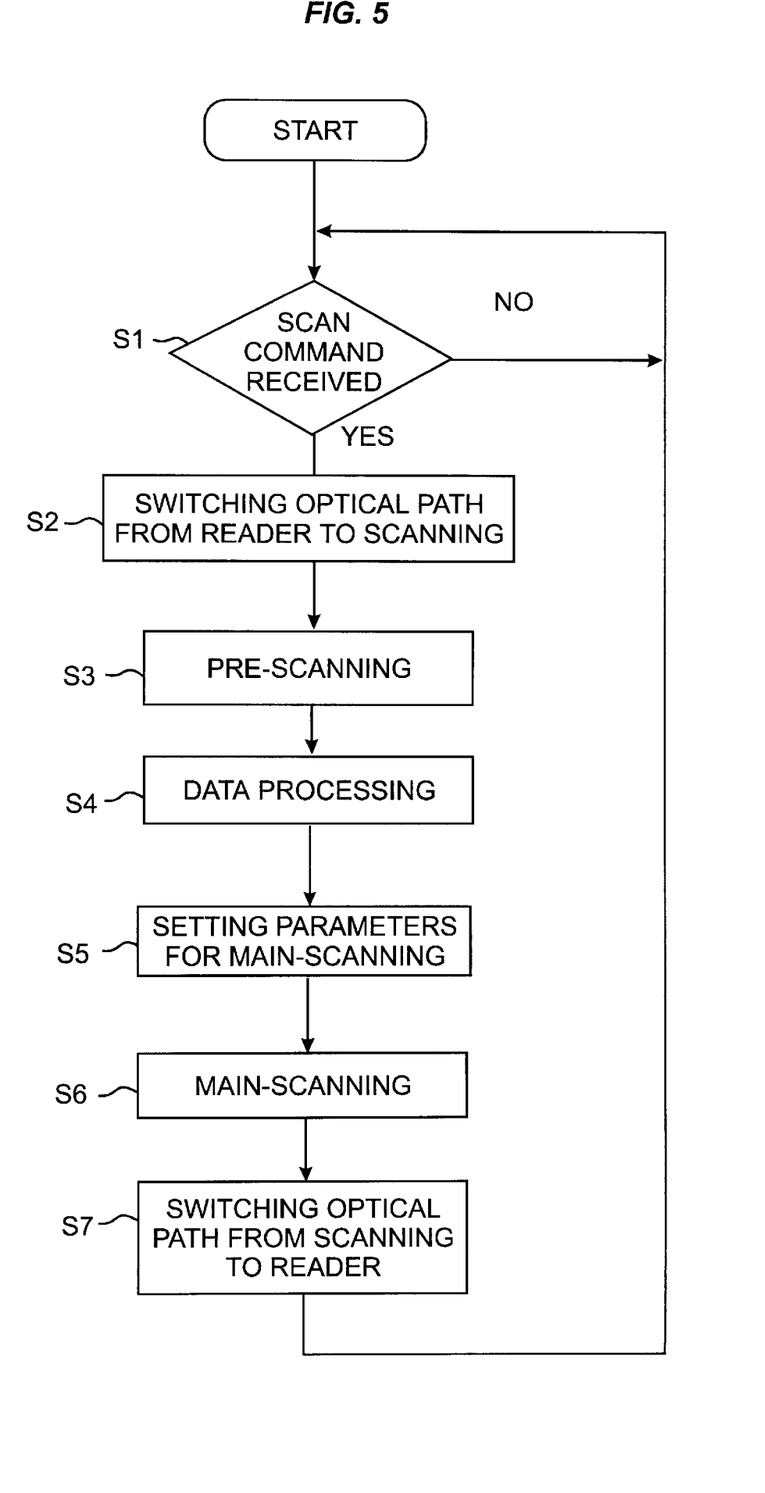
FIG. 5 is a main flow chart showing the scanning operation of the microfilm reader-scanner of said embodiment.

In the basic operation of this apparatus, as shown in the flow chart of FIG. 5, when the scan button of the reader-scanner is pressed or a scan instruction is received from a host computer (not shown in the drawings) connected to the microfilm reader-scanner via an interface, etc. (S1), the optical path is switched from the reader system that projects the image onto screen 11 to the scanning system that leads the image to image sensor 33 (S2) by shifting mirror 27. Next, pre-scanning is performed (S3), and image size/image position recognition is performed based on the read image data (S4). Then, the setting of necessary parameters for main scanning, such as the lamp light amount, image output positioning, etc., is carried out based on the read image data(S5). After main scanning is performed with set parameters and after the image data is inputted to image sensor 33, the image output process described below is performed, and the image is output from an output device such as a printer (S6). Then mirror 27 is moved, the optical path is changed from the scanning system to the reader system (S7), and the process returns to the status ready to receive the next scanning.

The processing of image data obtained after pre-scanning, as well as the processing of image data received after main scanning, will now be discussed below.

Figure 6:
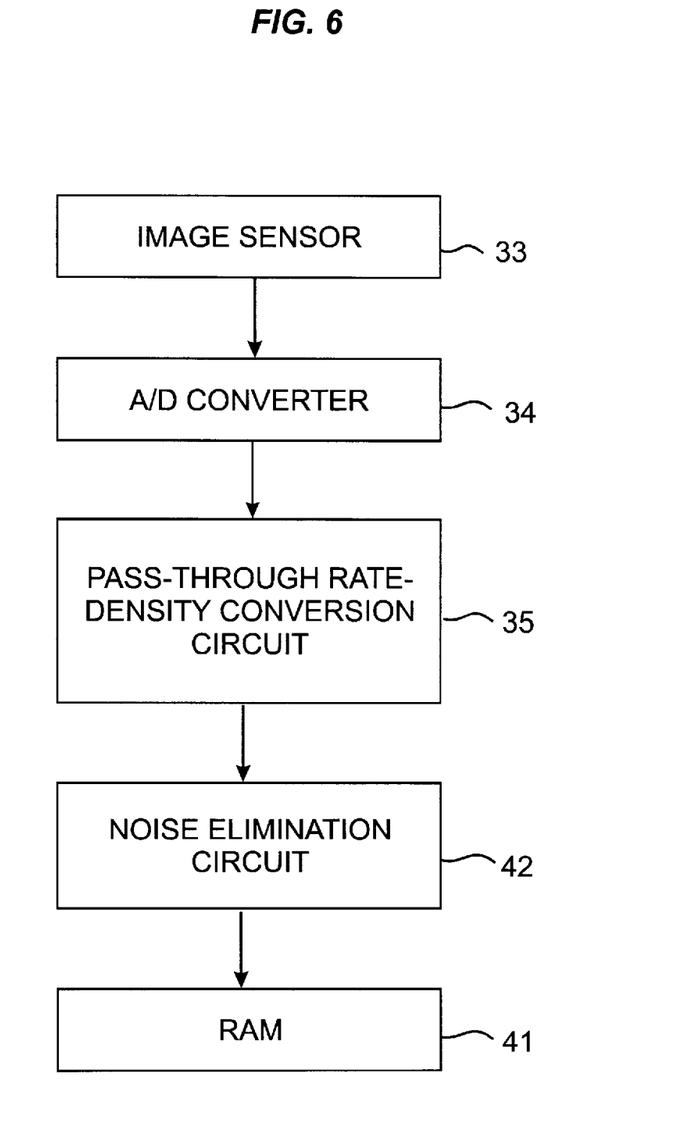
FIG. 6 is a block diagram showing the flow of image data during the pre-scanning operation performed by the microfilm reader-scanner of said embodiment.
Figure 7:
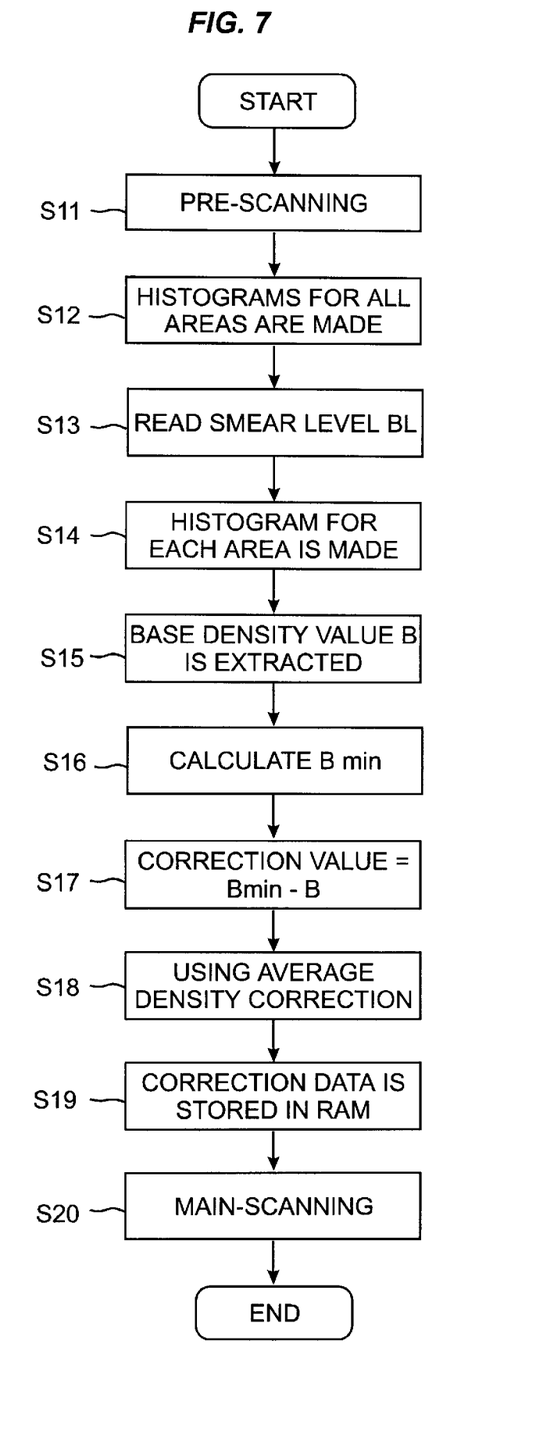
FIG. 7 is a flow chart showing the density correction operation of the microfilm reader-scanner of said embodiment.

FIG. 6 is a block diagram showing image data flow during pre-scanning, and FIG. 7 is a flow chart showing the sequence of the process of correcting for density unevenness.

As shown in FIG. 6, regarding image data, analog signals indicating the amount of light passing through the microfilm and input to image sensor 33 are converted into digital values by A/D converter 34. After the digital values are converted by a pass-through rate/density conversion circuit 35 into density data to be used during output in accordance with said digital values, the density data is sent through noise elimination circuit 42 to eliminate noise and then saved in RAM 41. In the pre-scanning, image data of a region for which output is designated is picked up (read) at certain intervals, or for every prescribed number of dots. In other words, the number of data bits picked up during pre-scanning is less than the number of data bits picked up during main scanning.

Next, the process to correct for density unevenness will be explained. First, the pre-scanning is performed (S11), histograms of all areas are made based on this pre-scanning data (S12), and smear level BL is read (or, a density level may be arbitrarily designated)(S13). Here, smearing refers to a region formed by black data only, and the smear level is a threshold level for said region.

Figure 8:
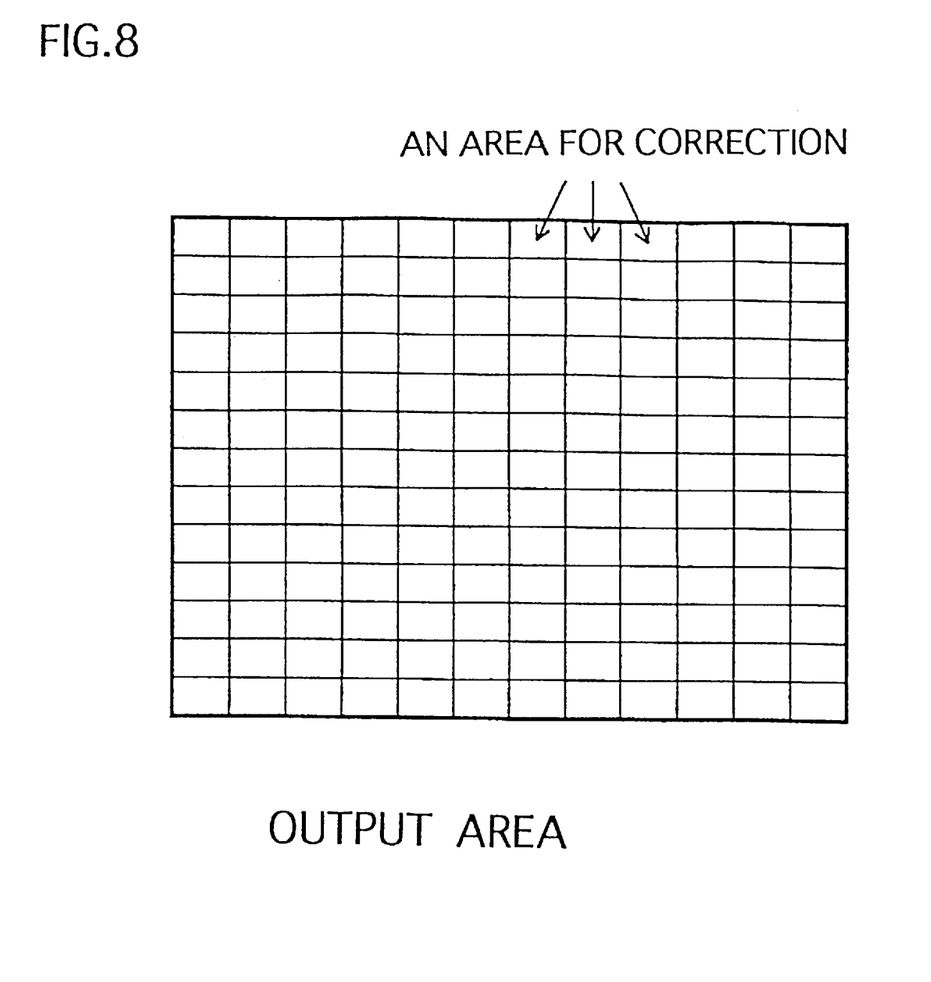
FIG. 8 shows an example of area setting in connection with said embodiment.
Figure 9:
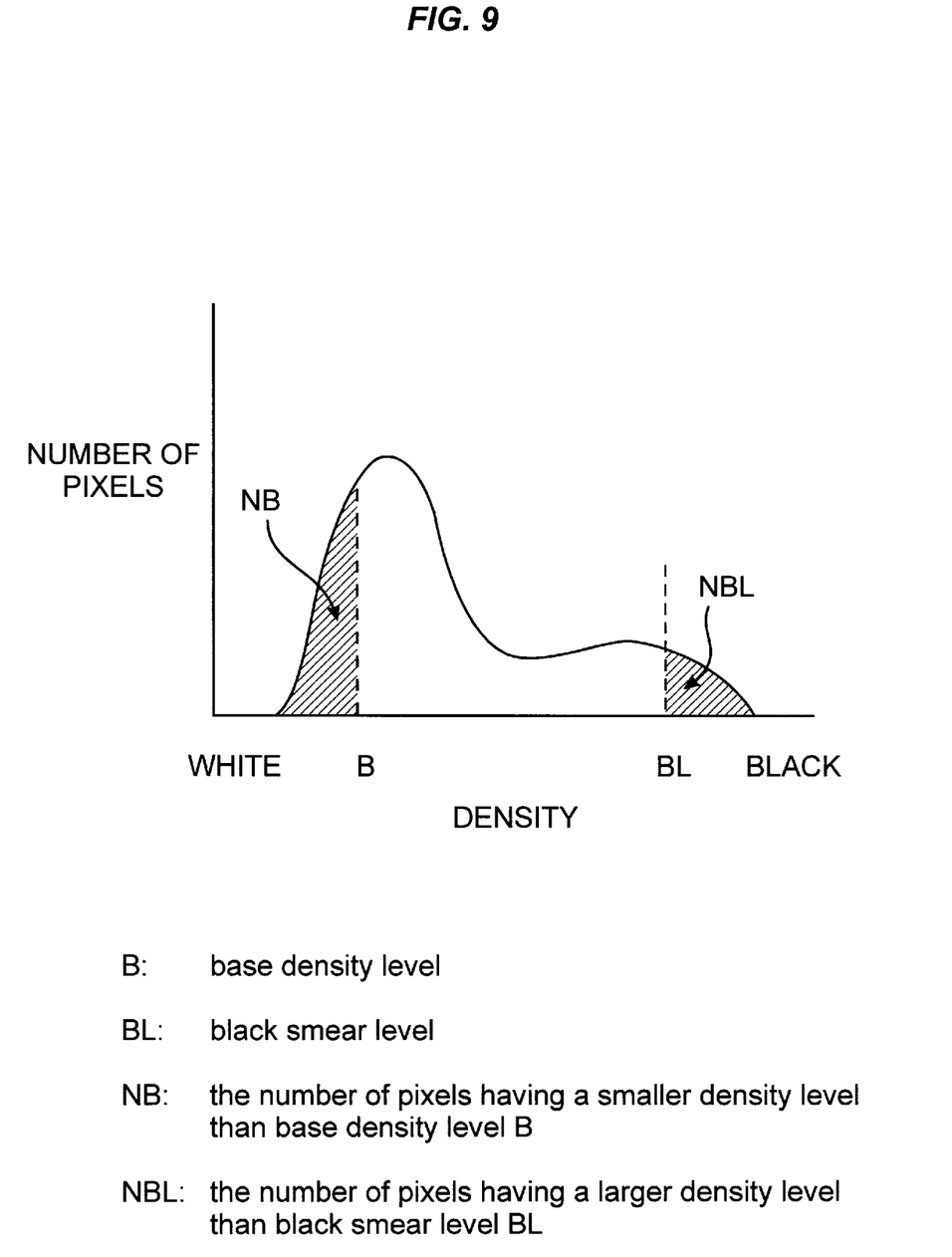
FIG. 9 shows an example of a histogram in connection with said embodiment.

Next, the region designated for output is divided into multiple lattice-like areas as shown in FIG. 8, and a density data histogram is made for each area (S14). FIG. 9 shows an example of a histogram made for each area. The horizontal axis of this graph expresses density data. The lower side of the density data corresponds to white (the background), and the upper side of the density data corresponds to black (characters).

The vertical axis, on the other hand, expresses the number of pixels that have that density data in that area. In other words, the histogram shows the pixel density data distribution.

In order to make a histogram from the multiple areas made by dividing the region, many pixels must be contained in each area. For example, a 600-pixel area comprising 20 vertical pixels by 30 horizontal pixels is set.

Figure 10:
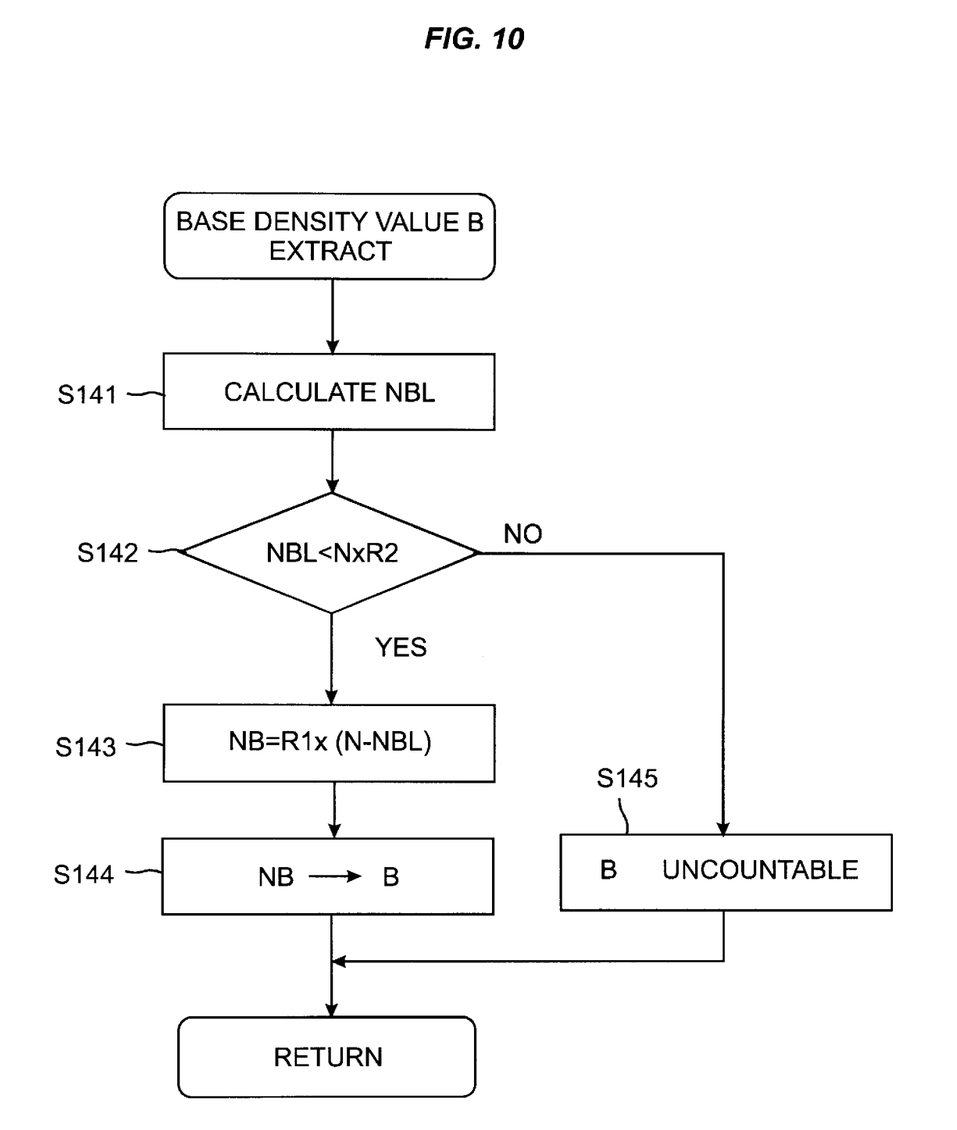
FIG. 10 shows the base density extraction subroutine (S15) for each area as shown in FIG. 7.

From the histogram made for each area, a base density level B (background density) for each area is extracted (S15). The extraction of this base density level B involves basically the reading of the density level of the NBth smallest pixel from the histogram for each area, and that level is set as the base density level. However, because a valid base density level cannot be obtained where there is a large amount of smearing in the area, NB (the number of pixels having a smaller density level than base density level N) is calculated according to a method that takes this smearing into account. FIG. 10 shows a flow chart of the determination of base density level B for an area of concern from among the areas of division taking into account this smearing.

While here the range within which the smearing is detected is said area of concern, it is not necessarily limited to this area. It is acceptable as long as the range is equal to or larger than the area of concern.

First, number of data bits NBL indicating black smearing, that is, the number of pixels that have data levels larger than black smear level BL obtained in the pre-scanning, is sought from the made histogram (S141). Where the number of black smear pixels is less than total number of data bits N of the area of concern (in the case of an area comprising 600 pixels, total data bit number N is 600) multiplied by level R2 (NO in S142), the NBth data level is set at a level obtained by subtracting black smear part data bits NBL from data bit number N of the area and then multiplying the result by constant R1 (NB=R1×(N−NBL)) (S143). The NBth data level is then set as the base density level B (S144). Where NBL is equal to or larger than N×R2 in step S142 (YES in step S142), base density calculation cannot be performed (S145).

In this way, after base density level B for each area is sought, the minimum base density level $B_{min}$ among all areas is sought (S16). The difference between base density level B for each area and minimum base density level $B_{min}$ is then determined, and this amount of the difference is set the density correction value (S17). For areas as to which a base density value could not be calculated when said base density value was extracted because much of the area was smeared, correction is made using the average density correction value for areas around said area (S18).

The correction value obtained is then converted into a value on the lamp light amount/pass-through light amount-density conversion curve for main scanning in accordance with the curve for pre-scanning to convert the lamp light amount and the light amount passing through the microfilm into density data, and is stored in correction value RAM (S19). The main scanning is then performed (S20).

Figure 11:
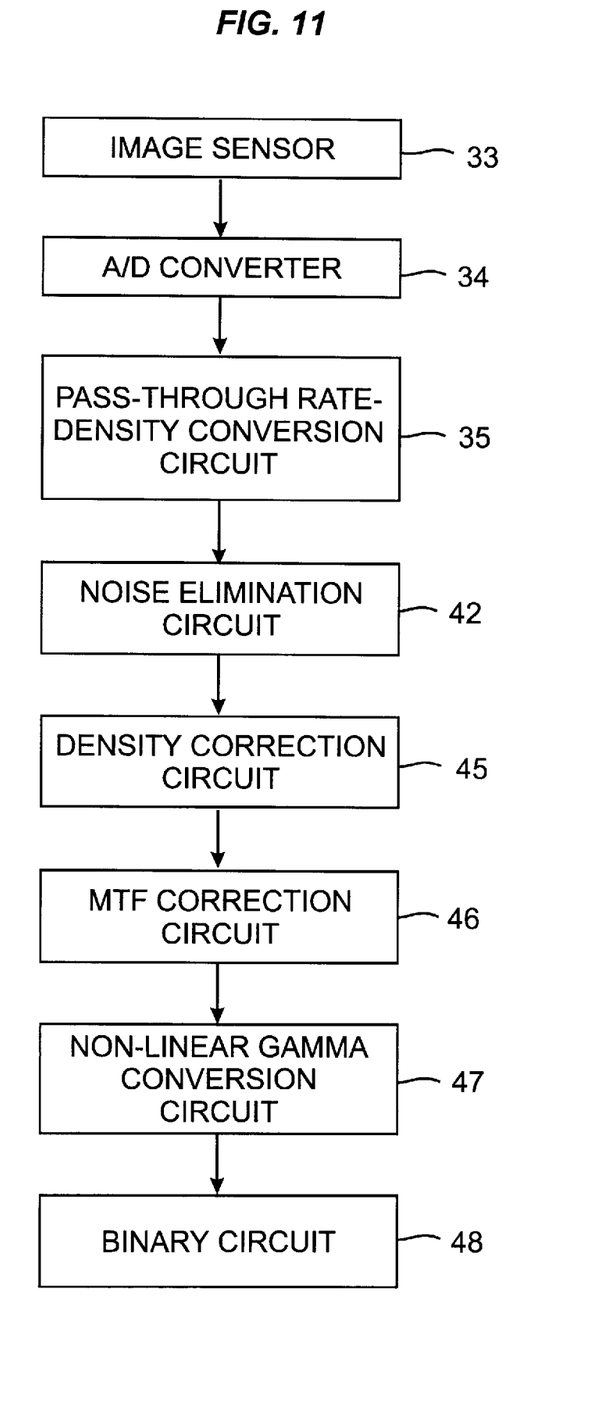
FIG. 11 is a block diagram showing the flow of image data during the main scanning operation performed by the microfilm reader-scanner of said embodiment.

Next, density correction at the time of main scanning will be explained. First, FIG. 11 shows the flow of image data during main scanning. As shown in the FIG. 11, the image data read by an image sensor 33 is converted by A/D converter 34 to digital values corresponding to the amounts of light passing through the microfilm, whereupon pass-through rate/density conversion (logarithmic conversion) 35 takes place. Then, after noise elimination circuit 42, a certain density shift occurs in a density correction circuit 45 for each area. The values then pass a MTF correction circuit 46 to sharpen edges and reduce noise, whereupon a non-linear gamma conversion circuit 47 takes place, and the values are output. A binary circuit 48 is added to the output path depending on the equipment to which the reader-scanner is connected.

Figure 12:
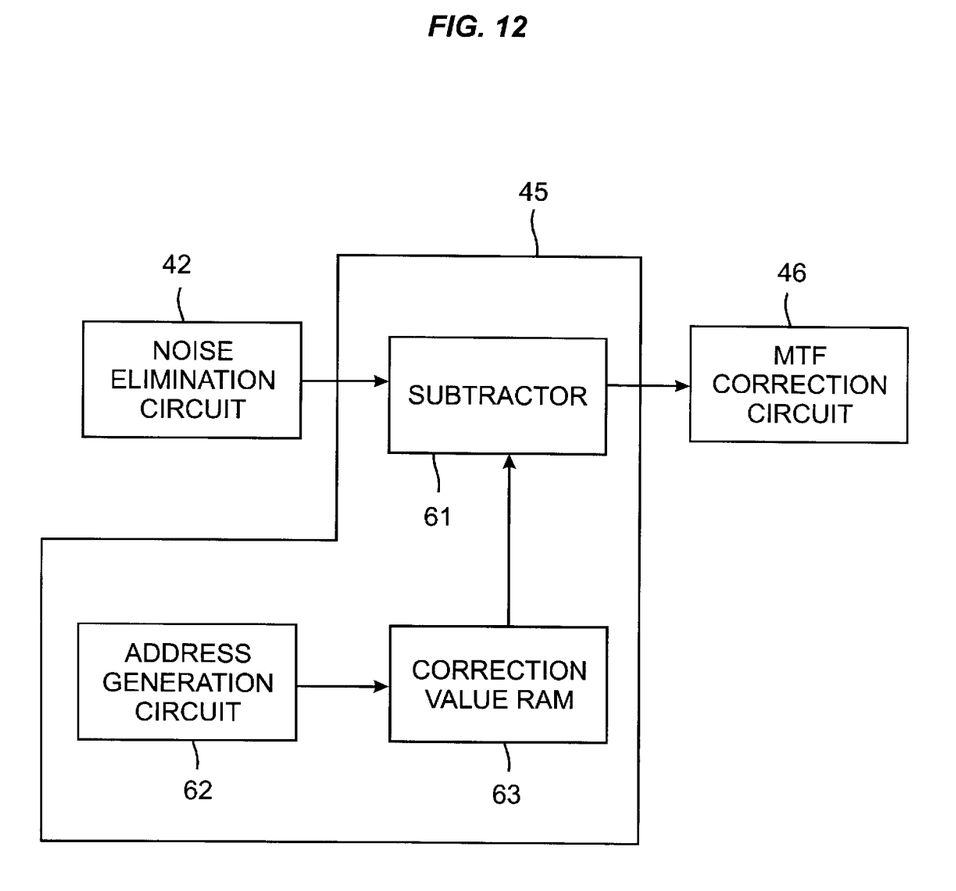
FIG. 12 is a block diagram of density correction circuit 45 in the microfilm reader-scanner of said embodiment.
Figure 13:
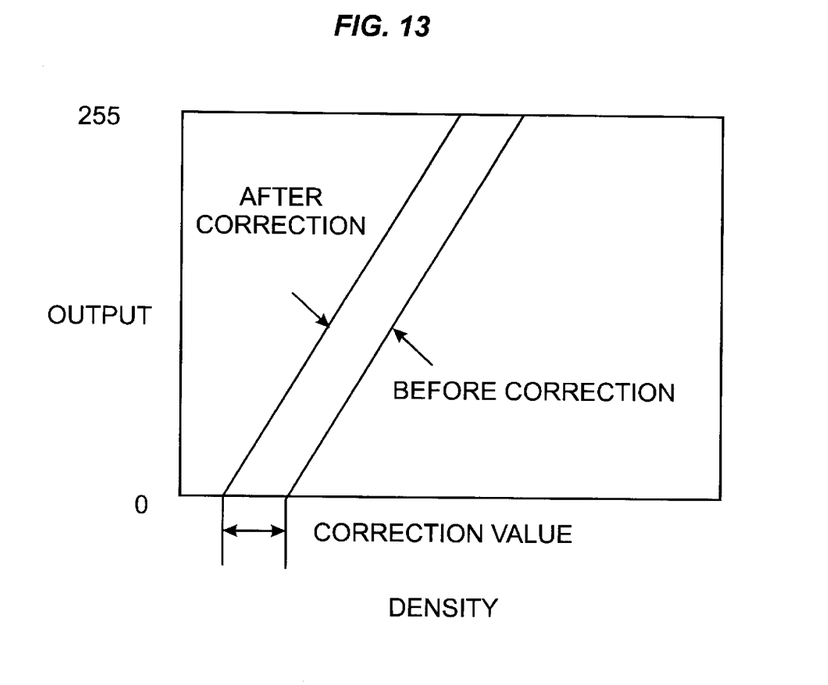
FIG. 13 shows the density-output characteristics of said embodiment.

FIG. 12 shows a block diagram of the density correction circuit 45. Density correction values obtained through the pre-scanning are stored in correction value RAM 63. An address generation circuit 62 generates a correction data read address from a pixel clock and this read address is sent to correction value RAM 63 by this address generation circuit 62, whereupon correction data for the area corresponding to each pixel is output. A value obtained by subtracting the correction data from the image data for each pixel is output by subtractor 61, at which point density correction takes place. This value obtained by subtracting the correction data from the image data equals the shift of the density/output relationship (γ-curve) as shown in FIG. 13.

Figure 14:
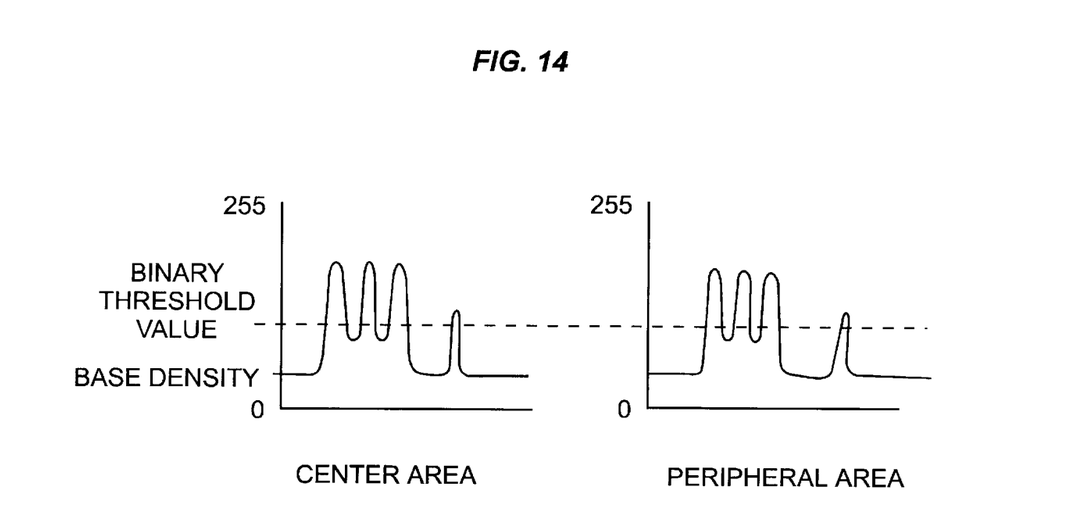
FIG. 14 shows an example of image data as to which correction for density unevenness has been performed in said embodiment.

FIG. 14 shows image data for which correction has been made in the manner described above. This image data is obtained by correcting the image data shown in FIG. 15. While characters and background are not differentiated well in the image data in the peripheral area in FIG. 15, by performing correction to this data, characters and background can be clearly differentiated using a single binary threshold level as shown in FIG. 14.

As described above, a case in which the present invention is applied in a microfilm reader-scanner was explained in the above embodiment. However, since the present invention has to do with correcting for density unevenness in the original document and obtaining a clear image, it may be appropriately used in other image reading equipment such as document scanners, facsimile machines and digital copiers, for example.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image processing apparatus comprising:

a reading means for reading an original image and for generating image data;

an area dividing means for dividing an area of said original image into divided areas having plural pixels;

a base density extracting means which extracts a base density for each area divided by said area dividing means;

a selection means for selecting one optional base density from among all of said base densities extracted by said base density extracting means; and a control means for adjusting image data for each divided area so as to correspond each of said extracted base densities to said one optional base density selected by said selection means.

2. The image processing apparatus according to claim 1, wherein said base density extracting means comprises a histogram making means which makes a histogram for said each divided area, wherein said histogram represents a distribution of density levels of all pixels in said each divided area.

3. The image processing apparatus according to claim 2, wherein said base density for said each divided area is extracted based on a pixel having a smallest density level in said histogram of said each divided area.

4. The image processing apparatus according to claim 3, wherein said base density for said each divided area is equal to a density level of an Mth pixel is a predetermined number, from said pixel of said smallest density level in said histogram of said each divided area.

5. The image processing apparatus according to claim 4, wherein a base density extracting operation is interrupted when a number of black smear pixels in said each divided area is equal to or larger than a predetermined number.

6. The image processing apparatus according to claim 5, wherein said control means adjust said image data using an average of density correction values of a peripheral area around a central area when a number of black smear pixels in said each area is equal to or larger than a predetermined number.

7. The image processing apparatus according to claim 1, wherein said one optional base density is a minimum base density among all of said base densities extracted by said base density extracting means.

8. The image processing apparatus according to claim 7, wherein said control means executes adjusting said image data based on a density correction value, wherein said density correction value is a difference between each base density level and said minimum base density level.

9. An image processing apparatus comprising:

a reading means for reading an original image and for generating image data;

an area dividing means for dividing an area of said original image;

a histogram making means which makes a histogram for said each divided area in order to extract a base density for each area divided by said area dividing means, wherein said histogram represents a distribution of density levels of all pixels in said each divided area;

a minimum base density extracting means for extracting a minimum base density from among all of said base densities extracted from said histogram for each area; and a control means for adjusting image data for each divided area so as to correspond each of said extracted base densities to said minimum base density extracted by said minimum base density extracting means.

10. The image processing apparatus according to claim 9, wherein said control means executes adjusting said image data based on a density correction value, wherein said density correction value is a difference between each base density level and said minimum base density level.

11. The image processing apparatus according to claim 9, wherein said base density for said each divided area is equal to a density level of an Mth pixel, where M is a predetermined number, from said pixel of said smallest density level in said histogram of said each divided area.

12. The image processing apparatus according to claim 9, wherein a base density extracting operation for said each divided area is interrupted when a number of black smear pixels in said each divided area is equal to or larger than a predetermined number.

13. The image processing apparatus according to claim 12, wherein said control means adjusts said image data using an average of density correction values of a peripheral area around a central area when a number of black smear pixels in said each area is equal to or larger than a predetermined number.

14. An image processing method comprising the steps of:

reading an original image and generating image data;

dividing an area of said original image into divided areas having plural pixels;

extracting a base density for each area divided by said area dividing step;

selecting one optional base density from among all of said base densities extracted by said base density extracting step; and adjusting image data for each divided area so as to correspond each of said extracted base densities to said one optional base density selected by said selection step.

15. An image processing method comprising the steps of:

reading an original image and generating image data;

dividing an area of said original image;

making a histogram for said each divided area in order to extract a base density for each area divided by said area dividing step, wherein said histogram represents a distribution of density levels of all pixels in said each divided area;

extracting a minimum base density from among all of said base densities extracted from said histogram for each area; and adjusting image data for each divided area so as to correspond each of said extracted base densities to said minimum base density extracted by said minimum base density extracting step.

* * * * *